United States Patent

[11] 3,569,633

[72] Inventor Rodman S. Brahman
Berien Springs, Mich.

[21] Appl. No. 692,536
[22] Filed Dec. 21, 1967
[45] Patented Mar. 9, 1971
[73] Assignee Heath Company
St. Joseph, Mich.

[54] FM STEREO RECEIVER HAVING AUTOMATIC THRESHOLD SWITCHING CIRCUITRY
11 Claims, 5 Drawing Figs.

[52] U.S. Cl. .......... 179/15, 325/348, 408, 456
[51] Int. Cl. .......... H04h 5/00
[50] Field of Search .......... 179/15
(ST) 325/348, 401, 402, 408, 456, 469, 478

[56] References Cited

UNITED STATES PATENTS

| | | | |
|---|---|---|---|
| 3,374,437 | 3/1968 | Heald | 325/478 |
| 3,323,066 | 5/1967 | Kurtz | 325/403 |
| 3,284,714 | 11/1966 | Battin | 325/478 |
| 2,959,673 | 11/1960 | Magnuski | 325/348 |
| 3,448,385 | 6/1969 | Von Recklinghausen | 325/348 |
| 3,296,379 | 1/1967 | Von Recklinghausen | 179/15 |

OTHER REFERENCES

F. L. Mergner " Product Detector for FM-Stereo" Audio August 1961 pg. 23,24,25,102

*Primary Examiner*—Kathleen H. Claffy
*Assistant Examiner*—Tom D'Amico
*Attorneys*—William R. Sherman, Leonard R. Fellen, Stewart F. Moore and Terry M. Presson

ABSTRACT: An FM stereo receiver circuit in which the reproduction is switched to the monophonic mode or cutoff entirely depending upon the amplitude of the high frequency noise superimposed upon the signal and depending upon the degree to which the signal is detuned.

INVENTOR.
RODMAN S. BRAHMAN,
BY
Wolfe, Hubbard, Voit & Osann
ATTORNEYS.

INVENTOR.
RODMAN S. BRAHMAN,
BY
Wolfe, Hubbard, Voit & Osann
ATTORNEYS.

SWITCHING DETECTOR IN STEREO MODE

SWITCHING DETECTOR
IN MONOPHONIC MODE

INVENTOR.
RODMAN S. BRAHMAN,
BY Wolfe, Hubbard, Voit & Osann
ATTORNEYS.

FM STEREO RECEIVER HAVING AUTOMATIC THRESHOLD SWITCHING CIRCUITRY

It is conventional in FM receivers to cut off the signal flowing to the loud speakers when the signal drops below a level which is considered necessary for faithful reproduction. This feature, generally referred to as "squelch," results in absolute silence between stations and the elimination of all signals below a certain signal level. In some designs of receivers there has been recognition of the fact that a signal can be reproduced monophonically at a somewhat lower input level than is required for good stereophonic reproduction. In such receivers stereo signals at a marginal signal level are merged within the receiver so that reproduction occurs in the monophonic mode.

One drawback of the conventional practice resides in the fact that a low signal level does not necessarily result in poor stereo reproduction. By establishing an arbitrary threshold of signal strength level, many pure, noiseless stereo signals are lost to the listener simply because they do not meet level requirements A further drawback of the conventional practice lies in the assumption that whenever a signal is at a reliably high level such signal must be of high quality. This is not true since a high level may be accompanied by a high noise level or may be inadvertently detuned resulting in substantial distortion in both the mono and stereo mode.

It is, accordingly, an object of the present invention to provide a squelch and stereo threshold circuit for an FM stereo receiver which does not rely upon the strength of the signal, or A.G.C. voltage, as a switching criterion but rather employs the accuracy of tuning and the absence of noise as joint criteria for permitting a stereo signal to be reproduced.

It is another object of the present invention to provide an FM stereo receiver using the noise level to control switching from the stereo to the monophonic mode, and to cut off the signal, and which involves sampling the noise at a frequency which is substantially higher than the frequency at which intelligence is transmitted, viz, a frequency on the order of 100 kHz.

It is still another object to provide a stereo receiver having provision for switching from stereo to mono, with eventual squelch, in which the threshold conditions may be individually established by the operator of the set.

It is, generally stated, an object of the present invention to provide an improved FM stereo receiver which makes maximum use of the stereo program material on the air, which permits stereo reproduction provided only that the signal is pure and properly tuned, even though the signal may be a low input level, and which insures that even a strong signal will not be reproduced unless it is sufficiently in tune to permit faithful reproduction. The net effect is that the set user has available to him a maximum number of stations preselected for signal quality and with silence over the intervening spaces.

It is a further object of the present invention to provide an FM stereo receiver in which the signal is squelched upon increase in noise level and having means for inhibiting the return of the signal in the face of a moderate drop in noise level to prevent the signal from fluttering on and off during marginal conditions.

It is yet another object to provide novel means for selecting stereo signals for reproduction and for squelching all signals which are not stereophonic.

It is an object of the invention to provide novel and improved circuitry for efficiently carrying out the above described modes of operation.

Other objects and advantages of the invention will become apparent upon reading the attached description and upon reference to the drawings in which:

FIGS. 1*a* and 1*b* comprise a circuit diagram, partly in block form, of an FM stereo receive including automatic switching circuitry in accordance with the present invention;

While the invention has been described in connection with a preferred embodiment, it will be understood that there is no intention to be limited to the particular embodiment shown but on the contrary I intend to cover the various modifications and alternative constructions included within the spirit and scope of the appended claims.

Figure 1A:
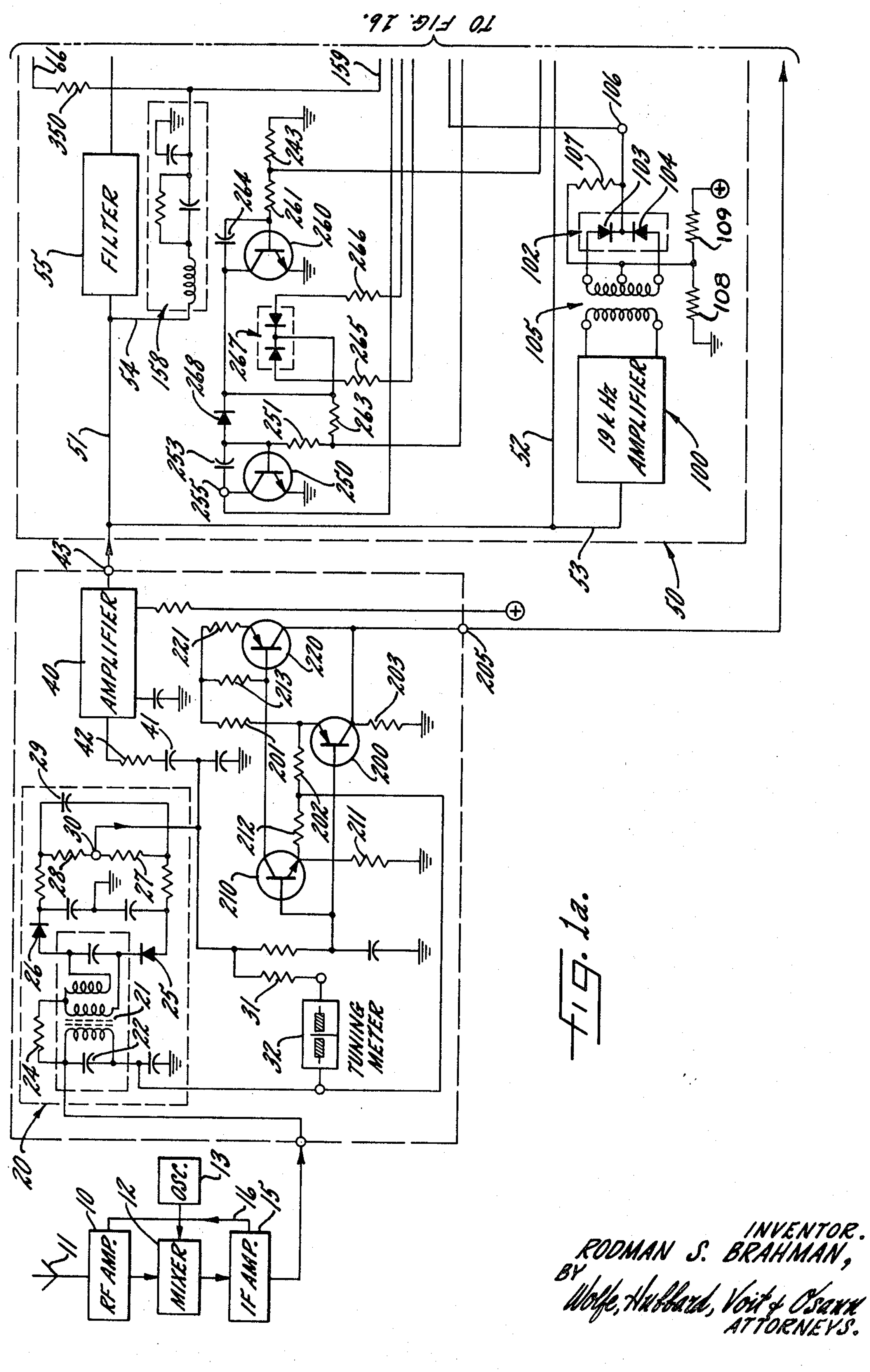
Figure 1B:
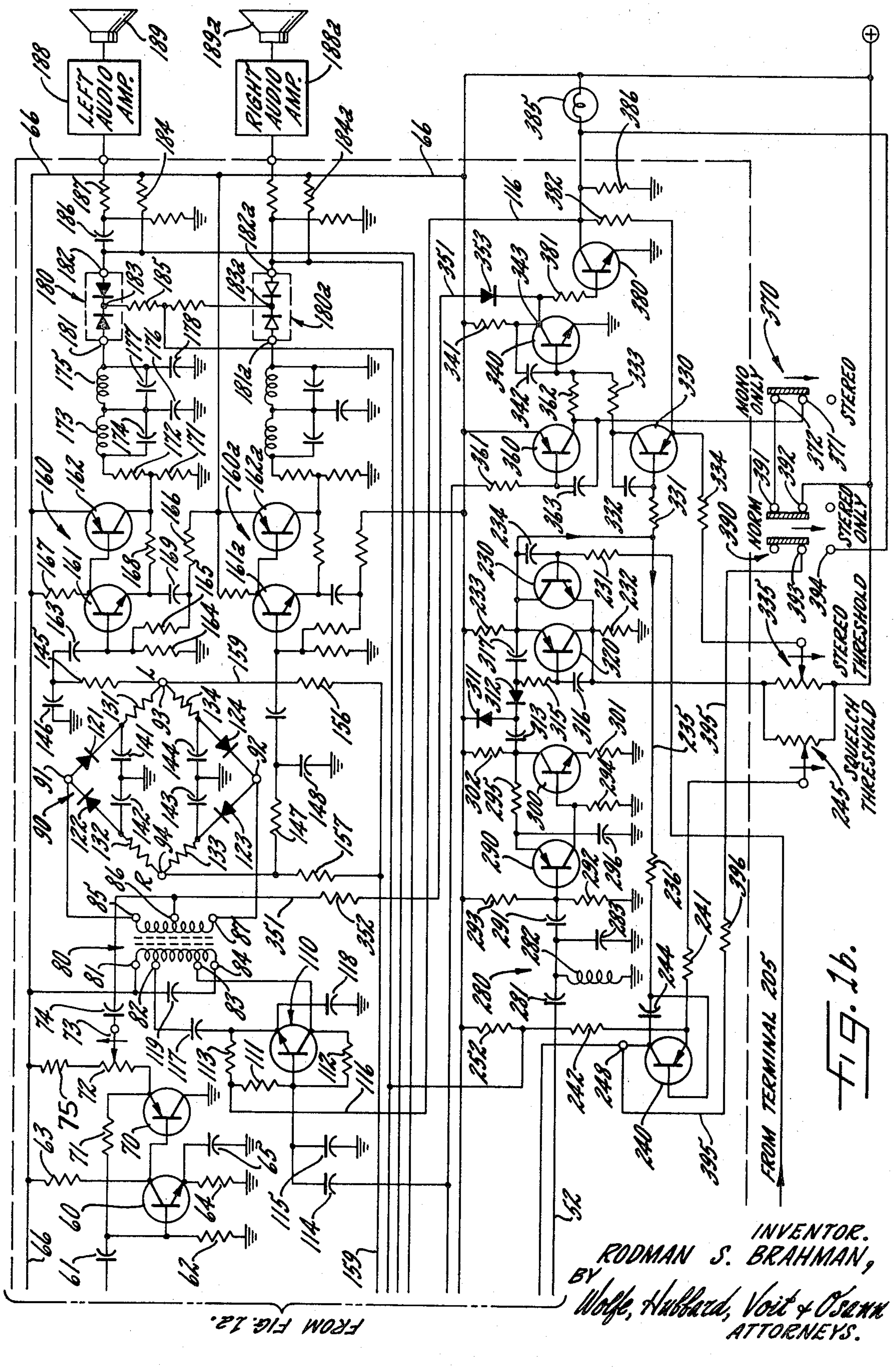
Figure 2:
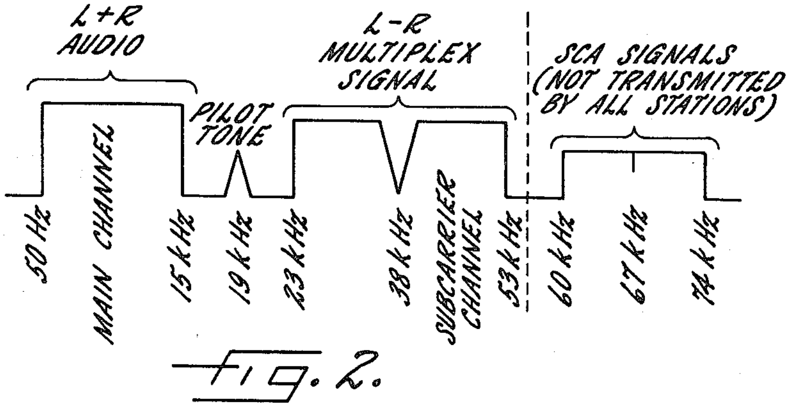
FIG. 2 is a diagram showing the components of the transmitted FM signal.

Turning now to the drawings, FIG. 1 shows a receiver circuit embodying the invention while FIG. 2 shows the components normally found in an FM stereo signal. The L+R, or left plus right, component which is in the audio spectrum (50 Hz. to 15 kHz.) is the portion of the signal utilized by monophonic FM receivers. Above the audio range and extending on each side of a center frequency of 38 kHz. is a multiplex L −R signal in the form of a suppressed carrier amplitude-modulated by the difference between the left and right-hand audio channels. Interposed between the audio and multiplex signals is a pilot signal at a frequency of 19 kHz. which is used as a phasing reference in decoding the multiplex signal and in controlling a switch to switch the receiver to the monophonic mode, as will be discussed. At the top end of the spectrum are optionally-transmitted signals referred to as SCA which are filtered out and not utilized in the present receiver.

The receiver includes an R.F. amplifier stage 10 connected to an antenna 11 and feeding a mixer 12 where the incoming signal is beat against that from a local tunable oscillator 13 to produce a signal at the usual I.F. frequency of 10.7 mHz. which is amplified in an I.F. amplifier 15. The I.F. amplifier, which is preferably of the type disclosed in Banick application Ser. No. 690,939filed Dec. 15, 1967 for I.F. Amplifier for FM Stereo Receiver, has an A.G.C. line 16 for controlling the degree of amplification in the RF amplifier.

The output of the amplifier 15 is fed to a ratio detector 20 which is of conventional design. It will suffice to say that the detector includes a transformer 21 having a capacitor 22 across its input for tuning the primary to I.F. frequency and having bifilar secondary windings, the center terminal of which is connected to the primary by a resistor 24, and the outer terminals of which feed diodes 25, 26. The latter have balancing output resistors 27, 28 bridged by a capacitor 29. The junction of the resistors defines an output terminal 30. The circuit from the output terminal is completed, via a resistor 31 and a tuning meter 32, through the primary winding of the transformer and the resistor 24. When the FM signal from the I.F. stage is at the center frequency of 10.7 mHz., the currents through the diodes cancel one another, but when the I.F. frequency deviates from the center frequency, as it will due to FM modulation, the current in one side of the circuit increases while that in the other side decreases to produce an output signal at terminal 30 which varies in accordance with the modulation.

In the event that, due to improper tuning of the I.F. amplifier, the signal received by the detector is not centered at the center frequency of 10.7 mHz., one of the diode loops will conduct grossly more than the other to produce a direct output voltage at the output terminal 30, the magnitude of which is dependent upon the degree of detuning. As will be discussed, this direct output voltage, in addition to giving an indication on the tuning meter, is utilized as a portion of the control signal controlling the squelch and stereo threshold switching functions.

From the output terminal 30 of the ratio detector the signal is passed to an amplifier 40. Interposed between the detector and amplifier is a series capacitor 41 and resistor 42, the capacitor insuring that the signal is transmitted to the amplifier free of the control voltage.

From the amplifier 40 the signal passes via terminal 43 to multiplex decoder circuitry indicated at 50. At this point the signal is directed along four separate paths. The first is the main signal path 51, the second is the noise signal path 52, the third is the pilot signal path 53, and the fourth is the compensating signal path 54 which injects a compensating signal into the switching detector, as will be described, Turning attention to the main signal, it is directed into a filter 55 which filters out frequencies above approximately 53 kHz. Thus any noise above this frequency is removed as well as the SCA signals which are not utilized in the present receiver. The resulting composite signal consisting of the main FM (L +R) signal and the multiplex (L − R) signal passes into a transistor amplifier stage 60 having an input capacitor 61, a base resistor 62, a collector resistor 63 and an emitter resistor 64 shunted by a capacitor 65. The collector resistor is fed from a positive bus 66. The signal from the collector is directly coupled to the base of an emitter follower transistor 70 having a feedback resistor 71 and an output or separation potentiometer 72 having a wiper 73 connected to an output capacitor 74 and having a series resistor 75.

To separate the composite signal into left and right (L and R) components, the composite signal is combined with a reference wave, or reinserted carrier, at the frequency of the subcarrier (38 kHz.) by means of a transformer 80 for feeding to a switching type detector. The transformer has a first winding with terminals 81—84 and a second winding having terminals 85—87. The composite signal is coupled to the transformer terminal 86 via the coupling capacitor 74, while the reference wave, as will be seen, is injected through terminals 82, 83 on the first winding. The output terminals 85, 87 of the transformer feed a switching detector 90 having input terminals 91, 92 and output terminals 93, 94 which lead to the left and right audio channels respectively.

Prior to discussing the operation of the transformer 80 and switching detector 90, reference will be made to the means for generating the 38 kHz. reference wave. In generating the reference wave the 19 kHz. pilot signal from the input line 53 is selectively filtered and amplified in amplifier 100 and then doubled in frequency in a doubler 102 for the purpose of synchronizing a local 38 kHz. oscillator coupled to the transformer 80. The doubler is in the form of a full wave rectifier made up of a pair of diodes 103, 104 coupled to the amplifier 100 by a transformer 105. The diode output terminal is designated 106. A load resistor 107 completes the circuit to the center tap of the transformer which is energized from a voltage divider 108, 109. The oscillator is in the form of a transistor 110 having base resistors 111, 112 and an emitter resistor 113. The synchronizing signal is coupled to the oscillator via a capacitor 114 connected to the transistor base which is shunted by a capacitor 115. The oscillator is turned on by effectively grounding a control line 116. This occurs automatically when a stereo signal is to be reproduced, as will be discussed. At the output of the transistor 110 the emitter is coupled to the transformer 80 via capacitor 117 and is partially bypassed to ground by a capacitor 118, while the collector circuit is completed through terminal 83 of the transformer. A capacitor 119 shunted across the transformer primary causes the circuit to resonate at approximately 38 kHz. The transformer thus serves to add the main audio signal, and the modulated subcarrier which is superimposed upon it, to the reference oscillations from the 38 kHz. oscillator 110. The switching detector 90 acts upon the sum of the waves to derive envelopes corresponding to the left and right-hand audio channels.

Turning attention to the specific circuit of the switching detector, it will be noted that it is in the form of a bridge circuit having diodes 121—124 and resistors 131—134 in the respective legs. Filter capacitors 141—144, connected between the respective diode-resistor junctions and ground, act to hold the peak voltage achieved from one cycle to the next. To deemphasize the high frequencies RC filters are provided formed or resistor 145 and capacitor 146 in the left-hand channel and resistor 147 with capacitor 148 in the right-hand channel. This compensates for the preemphasis which occurs in the transmitter.

Figure 3:
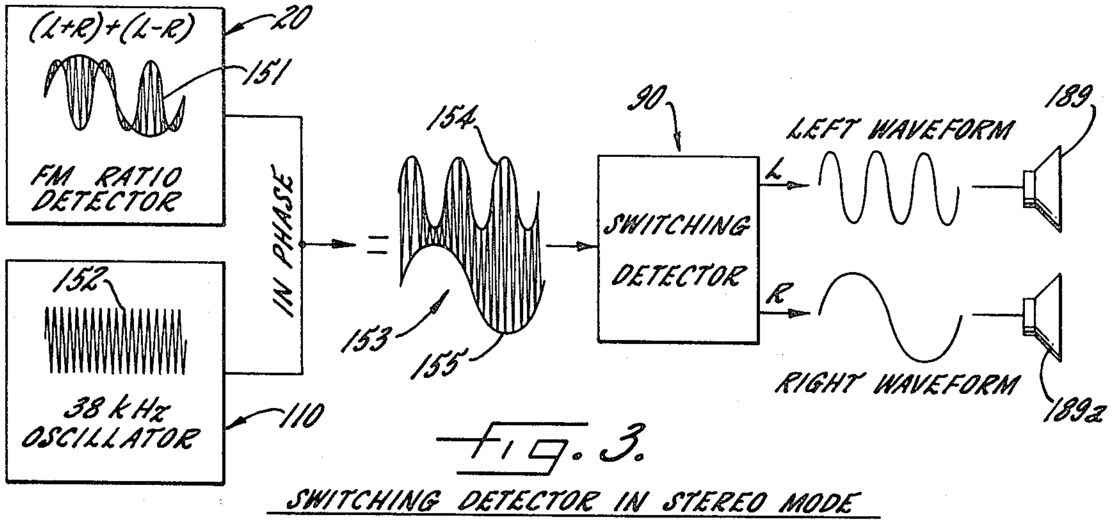
FIG. 3 is a diagram showing the addition of the composite FM wave and the reference wave in phase and the derivation of the resulting left and right wave forms when operated in the stereo mode.
Figure 4:
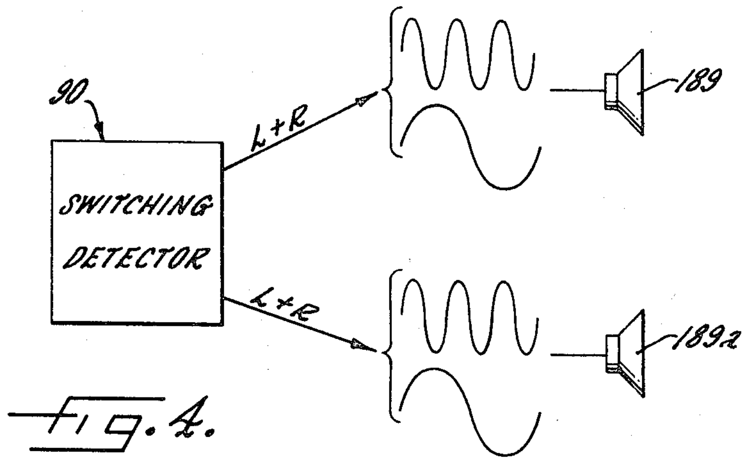
FIG. 4 is a diagram showing the cross channel switching brought about in the switching detector for monophonic reproduction.

While a switching detector is known to one skilled in the art, it will be helpful to describe the operation briefly in connection with the diagram of FIG. 3. In the latter figure the composite wave from the ratio detector is indicated at 151. The 38 kHz. reference wave, indicated at 152, is added in phase with the wave 151 to produce a wave 153 with the peaks thereof defining an upper wave form 154 and a lower wave form 155. During the positive peaks, with terminal 91 positive with respect to terminal 92, diodes 121, 124 conduct so that output voltage is supplied to terminal 93 feeding the left-hand channel. Conversely, when terminal 91 is negative no conduction takes place through the diodes 121, 124, but diodes 122, 123 conduct to produce output voltage at terminal 94 which feeds the right-hand audio channel. The capacitors 141, 144 store the voltage between positive peaks so that the "upper" envelope 154 passes through the left-hand channel while capacitors 142, 143 store the negative peaks so that the "lower" envelope 155 is passed through the right-hand channel, thereby reconstituting the original right and left-hand signals.

Since the above detection process is not mutually exclusive, some left-hand channel signal may be present in the right-hand output channel, and vice versa. To compensate for this, a portion of the composite stereo signal is fed, via line 54, to the right and left-hand channels 180° out of phase, i.e., subtractively. In the present instance the composite signal is injected through resistors 156, 157 connected to the detector output terminals 93, 94, respectively. The relative phase inversion occurs in transistor 60 in the main signal channel. In addition, interposed in the line 54 is a frequency selective network 158 formed of an inductor, resistor and capacitors. The relative amount of the net compensating signal, in line 159, is determined by the setting of the "separation" potentiometer 72. A more detailed discussion of the switching detector and the phasing of the reference wave may be had by referring to copending Brahman application Ser. No. 683,725 filed Nov. 16, 1967 for Phase Adjusting Arrangement For FM Stereo Receiver.

From the switching detector the signal is passed, in the left-hand channel, into a direct coupled amplifier 160 consisting of transistors 161, 162. The transistor 161 has an input capacitor 163 and base resistors 164, 165 and 166. The transistor 161 has a collector resistor 167 and an emitter resistor 168 which is connected to the collector of transistor 162 to provide D.C. feedback for stability. The resistor 168 is bypassed by capacitor 169. The transistor 162 has a collector resistor 171 and a resistor 172 in series with the output.

The signal is next purified by passing through a 19 kHz. trap which consists of an inductance 173 and capacitor 174 and a low pass filter consisting of inductance 175 and capacitors 176, 177, 178. The latter filters serve, together, to remove any residual pilot signal or subcarrier frequency above the audio range.

Connected in series with the output is a squelch switch in the form of a pair of biased diodes arranged back to back. Such diode pair indicated at 180 has an input terminal 181, an output terminal 182 and a switchable grounding terminal 183. As will be discussed, the diode terminals 181, 182 are both connected to sources of positive biasing voltage. Thus positive voltage appears at the input terminal 181 due to the fact that the input terminal is connected, via the filter inductances, to the collector terminal of the transistor 162. The output terminal 182 is made positive by connecting it, via resistor 184, to the positive bus. Under normal circumstances the central terminal 183 is grounded via a resistor 185 by means to be discussed, so that current may flow steadily through both diodes. The audio signal applied to input terminal 181 modulates such steady state current to produce a signal at output terminal 182. The signal is then coupled, via a capacitor 186 and resistor 187, to the left channel audio amplifier 188 which supplies the left speaker 189.

Since the circuit is symmetrical in the two channels, equivalent action takes place in the other, or right, channel and corresponding components have been given corresponding reference numerals with subscript *a*.

In accordance with the present invention means are provided for causing the receiver to switch from the stereo to the monophonic mode and thereafter into a condition of squelch depending upon the amount of high frequency noise in the FM signal and depending upon the degree to which the signal is detuned from an accurately tuned condition. More specifically in accordance with the invention, the direct voltage output of the ratio detector is utilized as a first control signal and the amount of noise present in the FM signal is used to produce a second control signal, which control signals are used jointly for automatic switching from the stereo mode to the monophonic mode and for actuating the squelch switching circuitry, at higher levels of control voltage, to cut off reproduction entirely. Finally, means are provided for adjusting the stereo threshold and point of squelch so that the point of triggering both of these functions may be easily established by the user of the set.

Attention will be first given to the means for generating a control signal which is representative of the accuracy of the tuning. Means are, first of all, provided for responding to the magnitude of the direct output voltage of the ratio detector without reference to polarity to produce a positive output signal whenever the receiver is detuned. In the case of the negative signal this is accomplished by a transistor 200 having emitter resistors 201, 202 and a collector resistor 203. The bias is set by resistor 202 so that when the voltage of the ratio detector swings negative, indicating detuning, conduction occurs in transistor 200 causing the output terminal 205, connected to the collector to become positive. For the purpose of responding to a positive voltage from the ratio detector, a deviation detector transistor 210 is provided having emitter resistors 211, 212 and a collector resistor 213. The collector is direct coupled to the base of a transistor 220 having an emitter resistor 221 and with the collector connected to the output terminal 205. Thus when the voltage from the ratio detector swings positive, indicating detuning, this produces conduction in the transistor 210 causing the base of transistor 220 to swing in the negative direction turning on transistor 220 and causing a positive voltage at the output terminal 205.

For responding to the positive output signal at the terminal 205, a squelch amplifier transistor 230 is provided having an input or base resistor 231, an emitter resistor 232, a collector resistor 233, and a base-collector capacitor 234. When positive voltage is applied to the base of the transistor 230 the collector terminal swings in the negative direction. This negative-going voltage is applied by a line 235 via a resistor 236 to the base terminal of a squelch threshold transistor 240 having emitter resistors 241, 242 and a collector resistor 243 (FIG. 1*a* ). The collector is bypassed by capacitor 244. For setting the effective bias of the transistor 240, and therefore the point at which the signal to the loudspeakers is squelched, a squelch potentiometer 245 is provided in the emitter circuit. With the squelch control at a convenient setting and with the voltage on the line 235 going negative a point is reached at which the squelch threshold transistor 240 conducts causing the collector, or output, terminal indicated at 248 to swing positive.

Means are provided for causing a ground circuit to be completed from the central terminal 183 of double diode 180 so that the latter is turned "on" during normal conditions but for causing the central terminal to be driven positive and effectively open circuited, turning "off" the double diode, when transistor 240 conducts under conditions of squelch or high noise level. Providing a return path to ground at the midpoint of the switching diodes 180 and the corresponding diodes 180*a* in the other channel, is accomplished by a transistor 250 (FIG. 1*a* ) having a base resistor 251 and a collector resistor 252 (FIG. 1*b* ) as well as a base-collector capacitor 253. Since the base is normally strongly positive, such transistor will normally be turned on effectively grounding the terminal 255 leading via resistor 185 to the diode midterminal 183. For the purpose of turning the transistor 250 off to break the diode ground connection, under conditions of noise with transistor 240 conducting, a transistor 260 is provided having a base resistor 261, a collector resistor 263 and a base-collector capacitor 264. The transistor 260 is normally biased to be nonconductive. The base resistor 261 is connected to the collector of transistor 240 so that when the latter transistor conducts, the base of the transistor 260 is swung in the positive direction, effectively closing the transistor output circuit, shunting the collector, through the emitter, to ground. The collector of transistor 260 is direct coupled to the base of the transistor 250 via a diode 268. Thus under the squelch condition when the transistor 260 conducts, and it its collector is swung to near ground potential, the base of transistor 250 will be similarly grounded causing this transistor to be switched to the nonconducting condition. This ungrounds the diode midterminal 183 cutting off flow of current in the diodes. Moreover, this ungrounds the collector resistor 252 so that it acts to apply positive voltage to the terminal 183 insuring cutoff of current flow. With both diode elements in both audio channels nonconducting, no signal may be transmitted to either of the two loudspeakers.

Means are provided for preventing a "click" in the loudspeakers which would be caused by the sudden cessation of current flow as the diodes are turned off. This click would be due to the fact that the current through the resistor 184 is suddenly reduced resulting in a sharp reduction in voltage drop producing a sharp increase in voltage at diode output terminal 182. To maintain this voltage constant during switching, means are provided for artificially loading the resistor 184 simultaneously with turning off the diodes so that the voltage drop across the resistor, and hence the voltage at terminal 182, remains unchanged. This is accomplished in the present instance by providing a loading resistor 265 which is connected from the diode output terminal 182 to the collector terminal of the transistor 260. The value of the resistor 265 is chosen so that the current flow through the diode supply resistor 184 remains constant even though the diodes are turned off. A similar resistor 266 is provided in the right channel. Since the resistors 265, 266 are both connected to the same point, the collector of transistor 260, and to prevent cross feeding of signal between the two channels, an isolating double diode 267 is interposed as shown.

In accordance with one of the aspects of the present invention, means are provided for preventing the squelch switching circuitry from fluttering on and off under marginal conditions of squelch control signal. Such fluttering or indecision is resolved by providing control "hysteresis" between the transistors 240, 250 so that once transistor 240 turns on it tends to remain on until a substantial drop in control signal occurs. More specifically, the transistors are coupled together via load resistor 252 and resistor 242 which is common to both of them. As has been previously observed, under normal conditions transistor 250 is conductive. The resulting voltage drop through the collector resistor 252 causes the positive voltage on the emitter of transistor 240 to be normally quite low. This causes the initial threshold of control voltage for turning on of the transistor 240 to be relatively high. Once transistor 240 is triggered for conduction, the transistor 260 is turned on which causes the transistor 250 to be turned off. This reduces the voltage drop through resistor 252 and increases the voltage on the emitter of transistor 240 so that such transistor will remain turned on even though the control signal from the ratio detector, or the noise signal to be discussed, drops moderately below its initiating value. In short, once triggered, the squelching circuitry remains active until there is a substantial drop in the level of control signal which initiated its action.

In accordance with the invention the squelch switching circuitry is controlled not only by the detune voltage from the ratio detector but also by the presence of high frequency noise in the FM signal. For the purpose of deriving a noise responsive control signal, a filter 280 is provided in line 52 having an input capacitor 281 and an LC circuit 282, 283 tuned to a frequency beyond that of the signal intentionally transmitted, i.e., higher than 74 kHz. which is the limit of the SCA upper side band. Preferably a resonant frequency on the order of 100 kHz. is selected. The noise frequency is amplified by a transistor 290 having an input capacitor 291, base resistors 292, 293, a collector resistor 294 and an emitter resistor 295, the latter being bypassed by capacitor 296. The transistor is direct coupled to a transistor 300 having an emitter resistor 301 and a collector resistor 302. The amplified noise signal from the transistor 300 is next passed to a voltage doubling detector circuit consisting of diodes 311, 312 and capacitor 313. The diodes act in a manner which is characteristic of voltage doublers to produce a negative DC voltage that is proportional to the amount of noise, in the region of 100 kHz. in the received signal. A filter circuit consisting of resistor 315 and associated capacitors 316, 317 serves to filter out any residual noise signal from the DC voltage fed to the base of the following transistor.

This signal is then applied to an emitter follower transistor 320 which shares load resistors 232, 233, associated with the transistor 230 previously discussed. It will be seen, then, that the level of control signal which is fed through the line 235, and which eventually controls the squelch switching circuitry, is derived both from the transistor 230, which handles the detune signal from the ratio detector, and from the transistor 320 which which produces a voltage proportional to noise. The net result is that, depending upon the setting of the squelch control 245, no sound will be heard from the loudspeakers if the receiver is tuned away from the center frequency or if the noise in such signal exceeds a predetermined level.

In accordance with one of the important aspects of the present invention means are provided for switching the receiver from the stereo mode to the monophonic mode whenever the amount of high frequency noise in the FM signal exceeds a predetermined level, a level which will normally by lower than that required for squelching action. Stated conversely, means are provided for permitting stereo reproduction only when the noise level in the signal drops to a predetermined threshold value which may be conveniently referred to as the "stereo threshold." Referring to the drawing, a stereo threshold transistor 330 is provided having a base resistor 331 which is connected to the control line 235 leading from the output of the transistor 320. The transistor 330 is provided having a base resistor 331 which is connected to the control line 235 leading from the output of the transistor 320. The transistor 330 has a collector-base capacitor 332 and a collector resistor 333. For establishing the threshold level, the threshold transistor 330 has an emitter resistor 334 which leads to the wiper contact of a stereo threshold potentiometer 335.

Coupled to the output of the stereo threshold transistor 330 is a stereo switcher transistor 340 having a collector resistor 341 and a base-collector capacitor 342. The transistor 340 is normally nonconducting, but since the collector of the transistor 330 is connected to the base of the transistor 340, conduction in transistor 330 causes a positive voltage to be applied to the base of transistor 340, causing the latter to conduct and effectively grounding the collector terminal indicated at 343.

Means are provided for causing the decoding circuitry, in the present instance the switching detector, to switch from its stereo mode to its monophonic mode upon condition in transistor 340 resulting from a noise signal above the threshold value. This accomplished in the present instance by connecting the switching circuitry to a source of positive biasing voltage and by completing the circuit of the switching detector through the output circuit of the transistor 340. Conveniently, the same lead 159 which carries the compensating signal is connected, via resistor 350, (FIG. 1*a* ) to the positive bus 66. The biasing circuit is completed via a line 351 leading from the terminal 86 of the transformer 80 through a resistor 352 and diode 353 to the collector terminal of the transistor 340. The effect of applying positive voltage from the line 159, through resistors 156, 157, is to forwardly bias diodes 122, 124 and reversely bias diodes 121, 123. It will be recalled that during the normal operation of the circuit a positive peak in the 38 kHz. reference wave had the effect of forward biasing diodes 121, 124 and reversely biasing diodes 122, 123 to direct all of the signal to the left channel. Similarly it will be recalled that the effect of a negative peak of the reference wave was to forwardly bias diodes 122, 123 and to reversely bias diodes 121, 124 to direct all of the signal to the right channel, the successive samplings on the positive and negative peaks serving to reconstitute the left an right wave envelopes in the respective channels. However the effect of the monophonic switching bias is to forwardly bias the diode 124 which feeds the left channel simultaneously with the forward biasing of diode 122 which feeds the right channel. The effect of this direct additional bias is to take over control of the switching from the reference 38 kHz. reference wave to cause the left and right wave forms to be directed into both the left and right audio channels. Thus the L + R signal is reproduced identically by both the left and right speakers so that the reproduction is, by definition, monophonic.

While the switching to the monophonic mode has been discussed in connection with a noise signal above a predetermined threshold level, and while it is the primary aim of the invention to bring about automatic switching to the monophonic mode as a result of noise, it is, nevertheless, a feature of the present circuit that switching to the monophonic mode is also brought about as a result of slight detuning of the signal, i.e., by reason of the increase in control voltage at the output of the ratio detector stage which results from the detuning. Thus it will be noted that I not only feed into the input of the stereo threshold transistor 330 the noise signal from the transistor 320, but also the "detune" signal from the transistor 230, the transistors 320, 230 both being connected to the control line 235 which feeds the base of the transistor 330.

To summarize the operation of the circuitry described above let it be assumed that the receiver is tuned to a random position on the tuning dial between strong and weak stations. It will be further assumed that the stereo threshold control 335 is set at a lower level than the squelch control 245 to produce stereo switching (to the monophonic mode) prior to squelching upon an increase in the tuning and noise control signals. Under such circumstances, with the early stages of the receiver running "wide open" because of lack of an A.G.C. signal, "white" or random noise will be present in the line 52 which, amplified by transistors 290, 300 and 320, will be sufficient to trigger the squelch threshold transistor 240 to its conductive state to operate the squelch control transistors 250, 260. The latter cause the bias on diodes 180, 180*a* to be reversed so that no signal passes to the audio amplifiers and loudspeakers. Quiet reigns. Upon turning the dial in the direction of the stronger station, as the station is approached a large "detune" signal is produced in the ratio detector producing a relatively high voltage at the terminal 205 which, amplified in the transistor 230, is adequate to maintain the squelch threshold transistor 240 in its conductive state so that the circuit remains in squelched condition notwithstanding the drop in noise level as the receiver is brought into tune. Finally, as tuning is accurately completed, the detune and noise signals both become so small, overcoming hysteresis, that the squelch threshold transistor 240 becomes nonconducting, restoring the transistors 250, 260 and the squelching diodes 180, 180*a* to the normal state so that sound eminates from the loudspeakers. During typical tuning of a strong station under low noise conditions, the stereo threshold transistor will operate to switch the amplifier from the monophonic to the stereo mode upon completion of the tuning, thereby insuring that the signal is reproduced in stereo only if the station is precisely tuned.

Next suppose that the dial is turned from the strong station toward the weaker one. Detuning causes a large "detune" signal to be generated which triggers operation of the squelch threshold transistor 240 so that the loudspeakers are turned off. Between stations, sufficient random noise will be encountered to maintain the receiver in the squelched condition. Tuning to the fringe of the weaker station a "detune" signal is generated in the ratio detector so that the squelch threshold transistor 240 remains conducting to keep the signal squelched until it is accurately tuned. At this point the signal to the transistor 240 will drop to such a low level that the transistor becomes nonconductive, restoring the squelch control transistors 250, 260 and their associated switching diodes to the normal state so that the signal is heard in the loudspeakers.

Assuming that the signal is pure and accompanied by little noise at the noise detection frequency, there will be insufficient control voltage to trigger the stereo threshold transistor 330 so that the station will be heard in the stereo mode. It is thus one of the features of the present receiver that it permits stereo reception of weak signals, provided they are noise free, unlike other receivers employing automatic switching from the stereo to the mono mode using the A.G.C. voltage as the switching criterion.

Suppose, however, that there is, superimposed upon the weak signal, a moderate amount of nose. Such noise, amplified by transistors 290, 300 and 320 will then be sufficient to trigger the stereo threshold transistor 330, causing the stereo switcher transistor 340 to become conducting to provide a path for the auxiliary bias in the switching detector via resistor 350 and line 159 and with the circuit being completed through line 351, resistor 352 and diode 353. Such auxiliary biasing voltage biases the diodes in the switching detector so that the envelopes of the left and right channel signals are directed to both of the audio channels for monophonic reproduction. It can be shown that under conditions of moderate noise in the signal more satisfactory reproduction is obtained upon such switching to the monophonic mode.

Next support that there is superimposed upon the weak signal a relatively high level of intermittent noise. Such high level will of course trigger the transistor 330. More importantly, however, the noise, depending upon the setting of the squelch control 245, may be at a high enough level to trigger the squelch threshold transistor 240, actuating the control transistors 250, 260 which bias the switching diodes 180, 180*a* to the squelching condition so that the station is, in effect, turned off. With the squelch control transistor 250 in its "off" condition, the voltage applied to the emitter of the squelch threshold transistor 240 is raised due to the reduction in the voltage drop in the resistor 252 thereby lowering the squelch threshold or, in other words, lowering the level of the noise signal which is capable of triggering the transistor to its conductive state. As a result of the lowering of the squelch threshold, no moderate reduction in the amount of noise will be capable of restoring the transistor 240 to its off condition to turn the station back on again. This therefore avoids the marginal condition in which a weak station might be repeatedly turned on and off by the squelching circuitry.

Hysteresis effect is also employed in the stereo threshold circuitry as will be covered in a subsequent paragraph, to prevent repeated switching from stereo to mono reproduction under marginal conditions.

Mention may be next made of the means for causing the decoder to be switched its monophonic mode upon reception of a monohponic signal, i.e., when no 19 kHz. pilot signal is being received. This is accomplished by a pilot detector transistor 360 having a to its which is connected by a resistor 361 to terminal 106 leading from the pilot signal doubler 102 (FIG. 1*a* ). The transistor 360 has a resistor 362 in the collector circuit and a base-collector capacitor 363. When a stereo signal is being received, the diodes 103, 104 in the doubler 102 are both conductive so that the base voltage on the transistor 360 is substantially equal to or higher than the emitter voltage and no conduction occurs. However upon reception of a monophonic signal, unaccompanied by any pilot signal, there is no signal available to make the diodes 103, 104 conductive so that the voltage on the terminal 106, and which is applied to the base of transistor 360, with proper choice of voltage divider resistors 108, 109, becomes approximately one volt less than the emitter voltage. This causes the transistor 360 to conduct, applying a positive voltage to the base of the stereo switching transistor 340, thereby completing the circuit in line 351 associated with the switching detector so that auxiliary bias is applied to the switching detector to switch the latter to its monophonic mode.

Provision is also made for manual switching to the monophonic mode by direct application of positive voltage to the base of the transistor 340. This is accomplished by the simple expedient of providing a switch 370 having a first contact 371 which is coupled to the transistor base and a second contact 372 which leads to a source of positive voltage. Thus when the switch is closed, the transistor 340 is locked in its conducting condition which, as noted, biases the switching detector for monophonic reproduction.

In the above discussion it has been assumed that line 116 forming the emitter return for the 38 kHz. oscillator 110 has been grounded for the purpose of making such oscillator operative. Means are provided for grounding this terminal only when a stereo signal is being received and for lighting a lamp serves that the receiver is operating in the stereo mode. This is accomplished by a lamp switching transistor 380 having a base resistor 381 fed from the collector terminal of the transistor 340. The stereo indicating lamp 385, the other terminal of which is connected to the positive bus, serves as a collector load. When a stereo signal is being received, the stereo switching transistor 340 is turned off. This causes a positive voltage to be applied to the base of the transistor 380, thus turning on this transistor and completing the circuit through the indicating lamp 385 turning the lamp on. For decreasing the surge current of the lamp, and thus keeping it in readiness, a warming current is conducted to it under "off" conditions by a resistor 386. When the transistor 380 is conductive for stereo reception it provides an effective ground connection for the line 116 leading to the biasing resistors 111, 112 of the oscillator transistor 110 to provide the necessary 38 kHz. oscillations.

For the purpose of providing hysteresis effect in the stereo-mono switching circuit, a feed-back connection is provided in the form of a resistor 382 which couples the collector of the lamp switching transistor 380 to the emitter of the stereo threshold transistor 330. Under normal, quiet conditions the stereo threshold transistor 330 and the stereo switching transistor 340 are both turned off and the stereo lamp transistor 380 is turned on. The latter grounds one end of the resistor 382 thus causing the emitter voltage to exist at a lower level than would otherwise be the case. The setting of the threshold control 335 determines the level of the noise signal which will trigger the transistor 330 initially.

Upon an increase in noise above the threshold level, evidenced by an increase in the negative voltage applied to the transistor 330, the transistor becomes conductive, turning on the transistor 340 and turning off the lamp transistor 380. This causes the voltage applied to the feed back resistor 382 to go from near ground potential to a positive potential so that the voltage applied to the emitter of transistor 330 is increased positively. With a higher emitter voltage, assuming that the noise voltage applied to the base remains at a constant level, the transistor 330 remains even more firmly turned on. Thus if the noise voltage applied to the input of the transistor 330 should fall back (become less negative) to the original threshold point or slightly below, this will not restore the transistor 330 to its nonconductive state. On the contrary, by reason of the action of the feed back resistor 382, the noise voltage level will have to drop substantially below the point of the initial threshold before the circuitry is switched back to the normal stereo mode. To summarize, a certain noise level is effective to switch the circuitry from stereo reproduction to monophonic-reproduction but a substantial lessening of the noise signal is required for switching back again. This hysteresis effect avoids a state of indecision under marginal noise conditions and insures against rapid switching back and forth between the two modes.

Where it is desired to receive only stations broadcasting stereo, a "stereo only" switch 390 is provided having normally-closed contacts 391, 392 which are in series with the contacts of the switch 370 for disabling that switch from switching to the monophonic mode. Moreover the switch has a pair of normally open contacts 393, 394, the contact 394 being connected to the collector terminal of the stereo lamp switch 380 and the contact 393 being connected, via line 395 and resistor 396, to the collector terminal of the squelch threshold transistor 240. The voltage at the collector terminal of transistor 380 is highly positive when the transistor is not turned on, i.e., during reception of a monophonic signal. Thus when the "stereo only" switch contacts 393, 394 are closed, a highly positive voltage is supplied via line 355 to the base of squelch control transistor 260. This simulates the condition of high noise or appreciable detuning, turning on the transistor 260 and turning off the associated transistor 250 to switch the diodes 180, 180*a* to the squelch condition so that no signal passes to the loudspeakers. When a stereo signal is received, corresponding to the turning off of transistor 340 and the turning on of transistor 380, the collector voltage is substantially reduced and, provided that the transistor 240 has not been made conductive by noise or detuning, positive voltage is removed from the base of the squelch control transistor 260, restoring normal bias to the switching diodes 180, 180*a*, permitting the stereo signal to be reproduced at the loudspeakers.

For assistance in practicing the invention the various components in the circuit described above may be assigned values taken from Heath Company manual covering model AR-15 Receiver, keyed to the reference numerals in the drawings, as follows:

| | |
|---|---|
| **24** | 470 ohms |
| **27** | 10K ohms |
| **28** | 5490 ohms |
| **29** | 10 $\mu$f. |
| **31** | 10k ohms |
| **41** | 10 $\mu$f. |
| **42** | 3300 ohms |
| **60** | 2N3393 |
| **61** | 10 $\mu$f. |
| **62** | 220K ohms |
| **63** | 10K ohms |
| **64** | 4700 ohms |
| **65** | 100 pf. |
| **70** | MPS6517 |
| **71** | 390K ohms |
| **72** | 750 ohms |
| **74** | 50 $\mu$f. |
| **75** | 470 ohms |
| **110** | 2N3393 |
| **111** | 6800 ohms |
| **112** | 100K ohms |
| **113** | 2200 ohms |
| **114** | 0.001 $\mu$f. |
| **115** | 0.01 $\mu$f. |
| **117** | 0.1 $\mu$f. |
| **118** | 0.005 $\mu$f. |
| **119** | 2700 pf. |
| **131** | 10ohms |
| **132** | 10K ohms |
| **133** | 10K ohms |
| **134** | 10K ohms |
| **141** | 470 pf. |
| **142** | 470 pf. |
| **143** | 470 pf. |
| **144** | 470 pf. |
| **145** | 33K ohms |
| **146** | 1800 pf. |
| **147** | 33K ohms |
| **148** | 1800 pf. |
| **156** | 27K ohms |
| **157** | 27K ohms |
| **158** | 70 mh., 6800 ohms, 1800 pf., 680 pf. |
| **161** | 2N3393 |
| **162** | MPS6517 |
| **163** | 0.047 $\mu$f. |
| **164** | 1.5 m ohms |
| **165** | 220K ohms |
| **166** | 1000 ohms |
| **167** | 3300 ohms |
| **168** | 12K ohms |
| **169** | 10 $\mu$f. |
| **171** | 2200 ohms |
| **172** | 1000 ohms |
| **173** | 20 mh. |
| **174** | 3300 pf. |
| **175** | 70 mh. |
| **176** | 3300 pf. |
| **177** | 300 pf. |
| **178** | 1800 pf. |
| **184** | 47K ohms |
| **185** | 4700 ohms |
| **186** | 0.22 $\mu$f. |
| **187** | 15K ohms |
| **200** | MPS6517 |
| **201** | 6800 ohms |
| **202** | 390 ohms |
| **203** | 100K ohms |
| **210** | 2N3393 |
| **211** | 8200 ohms |
| **212** | 390 ohms |
| **213** | 100K ohms |
| **220** | MPS 6517 |
| **221** | 68K ohms |
| **230** | 2N3393 |
| **231** | 220K ohms |
| **232** | 270 ohms |
| **233** | 10K ohms |
| **234** | 0.01 $\mu$f. |
| **236** | 27K ohms |
| **240** | MPS 6517 |
| **241** | 2200 ohms |
| **242** | 22K ohms |
| **243** | 47K ohms |
| **244** | 0.1 $\mu$f. |
| **245** | 1000 ohms |
| **250** | 2N 3393 |
| **251** | 47K ohms |
| **252** | 68K ohms |
| **253** | 0.047 $\mu$f. |
| **260** | 2N 3393 |
| **261** | 220K ohms |
| **262** | 47K ohms |
| **263** | 47K ohms |
| **264** | 0.047 $\mu$f. |
| **265** | 33K ohms |
| **266** | 33K ohms |
| **281** | 100 pf. |
| **282** | 2 mh. |
| **283** | 1200 pf. |
| **290** | MPS 6517 |
| **291** | 33 pf. |
| **292** | 1M ohms |
| **293** | 3.3M ohms |
| **294** | 10K ohms |
| **295** | 10K ohms |
| **296** | 0.01 $\mu$f. |
| **300** | 2N 3393 |
| **301** | 47 ohms |
| **302** | 1000 ohms |
| **313** | 0.01 $\mu$f. |
| **315** | 47K ohms |
| **316** | 0.02 $\mu$f. |
| **317** | 0.1 $\mu$f. |
| **320** | MPS 6517 1 |
| **330** | MPS 6517 |
| **331** | 27K ohms |
| **332** | 0.1 $\mu$f. |
| **333** | 27K ohms |
| **334** | 1500 ohms |
| **335** | 1000 ohms |
| **340** | 2N3393 |

| | |
|---|---|
| 341 | 1200 ohms |
| 342 | 0.1 μf. |
| 350 | 22K ohms |
| 352 | 10K ohms |
| 360 | MPS 6517 |
| 361 | 27K ohms |
| 362 | 100K ohms |
| 363 | 0.1 μf. |
| 380 | 2N3416 |
| 381 | 8200 ohms |
| 382 | 15K ohms |
| 386 | 390 ohms |

In the following claims the term "substandard signal" refers to a signal which is not capable of providing faithful stereo reproduction by reason of the presence of noise, detuning, drop in signal level, or the like. The term "detuning" refers to the degree to which the center frequency of the signal from the I.F. amplifier is offset, by reason of mistuning of the local oscillator, from the resonant frequency of the ratio detector. The term "ratio detector" includes FM detector capable of producing a control voltage capable of representing the degree of detuning from an optimum tuned condition. Reference to the "level" of the control signal has to do with the change in level which occurs upon increase in noise or detuning. The term "bandpass filter" is intended to cover any filter passing nose, a signal, or falling within a frequency range. The term "bypass" as applied to a capacitor refers to a shunting convection acting to divert the AC signal component either partially or totally.

I claim:

1. In an FM stereo receiver having an R.F. stage, tunable local oscillator, mixer, I.F. amplifier, ratio detector, decoder and dual channel audio amplifier, the combination of tuning responsive means for producing a control signal representative of a condition of detuning, means including a band pass noise filter for producing a control signal representing the amount of high frequency noise in the output of the ratio detector, first switching means in the decoder for establishing whether the signal is fed to the audio amplifier in the stereo or monophonic mode, second switching means for selectively squelching the signal in the audio amplifier, and means jointly responsive to the increasing level of the control signals for operating said switching means in sequence.

2. The combination as claimed in claim 1 in which the means jointly responsive to the level of the control signals includes separate adjustable controls for setting the stereo and squelch threshold conditions.

3. The combination as claimed in claim 1 in which the band pass noise filter is constructed and arranged to pass noise components having a frequency in excess of the intelligence-conveying frequencies in the waves received by the receiver.

4. The combination as claimed in claim 1 in which the band pass noise filter is constructed and arranged to pass noise frequency components in the neighborhood of 100 kHz.

5. In an FM stereo receiver having an R.F. stage, tunable local oscillator, mixer, I.F. amplifier, ratio detector, decoder and dual channel audio amplifier, the combination of means for producing a control signal representative of the degree to which the signal passing to the audio amplifier is substandard, first switching means in the decoder for establishing whether the signal is fed to the audio amplifier in the stereo or monophonic mode, second switching means for selectively squelching the signal in the audio amplifier, means responsive to a first threshold level of control signal for operating said first switching means for feeding of the signal in the monophonic mode, and means responsive to a higher threshold level of control signal for operating the second switching means for squelching of the signal.

6. The combination as claimed in claim 5 including means associated with at least the second switching means for lowering the switching threshold automatically during the time that the switch is in its switched condition thereby to maintain the switching means in such switched condition notwithstanding moderate subsequent reduction in the level of the control signal to a point below the initial threshold to inhibit repeated switching back and forth under marginal conditions of control signal.

7. In an FM receiver having an R. F. stage, tunable local oscillator, mixer, I.F. amplifier, ratio detector and audio amplifier, the combination of tuning-responsive means for producing a control signal representative of the degree of detuning, means including a band pass noise filter for producing a control signal representing the amount of high frequency noise in the output of the ratio detector, switching means for selectively squelching the signal in the audio amplifier, means for combining the signals from the tuning responsive means and noise filter means to produce a control signal, and means responsive to the control signal for operating the switching means to prevent reproduction of a signal by said amplifier which is detuned or which is accompanied by high frequency noise 8. In an FM stereo receiver having an R. F. stage, tunable local oscillator, mixer, I.F. amplifier, ratio detector, decoder and dual channel audio amplifier, the combination of tuning-responsive means for producing a control signal representative of the degree of detuning, means including a band pass noise filter for producing a control signal representing the amount of high frequency noise in the output of the ratio detector, first switching means for selectively squelching the signal in the audio amplifier, second switching means in the decoder for determining whether the signal is fed to the audio amplifier in the stereo or monophonic mode, means for coupling the control signals to the switching means, and means associated with each of said switching means for adjusting the level of control signal at which switching takes place.

9. In an FM stereo receiver having an R.F. stage, tunable local oscillator, mixer, I.F. amplifier, ratio detector and audio amplifier, the combination of tuning-responsive means for producing a control signal representative of the degree of detuning, means including a band-pass noise filter for producing a control signal representing the amount of high frequency noise in the output of the ratio detector, switching means for selectively squelching the signal in the audio amplifier, means for combining the signals from the tuning responsive means and noise filter means to produce a control signal, means responsive to the control signal's reaching a predetermined threshold level for operating the switching means to prevent reproduction of a signal by said amplifier which is detuned or which is accompanied by noise, said responsive means including means for establishing a condition of hysteresis to inhibit return to the unsquelched condition, thereby to prevent repeated switching between the squelched and unsquelched condition upon variations in signal noise level.

10. In an FM stereo receiver having an R.F. stage, tunable local oscillator, mixer, I.F. amplifier, ratio detector, decoder, and dual channel audio amplifier the combination of tuning-responsive means for producing a control signal representative of the degree of detuning, means including a band-pass noise filter for producing a control signal representing the amount of high frequency noise in the output of the ratio detector, means for combining the signals from the tuning responsive means and noise filter means to produce a control signal, first switching means associated with the decoder for switching from stereo to monophonic reproduction in the audio amplifier, second switching means for selectively squelching the signal in the audio amplifier, means responsive to the control signal's reaching respective threshold levels for operating the first and second switching means, said first and second switching means each having means for establishing a condition of hysteresis to inhibit return to the initial condition, thereby to minimize switching back and forth under marginal conditions of control signal.

11. In an FM stereo receiver having a tunable R.F. stage, local oscillator, mixer, I.F. amplifier, ratio detector, decoder, and dual channel audio amplifier, the combination of means responsive to a substandard signal at the output of the ratio detector for producing a disabling control signal, switching means for selectively squelching the signal in the audio amplifier, means for coupling the control signal to the switching means for selectively squelching the signal in the audio amplifier, detecting means for detecting the reception of a monophonic signal, and means including a selectively actuatable "stereo only" switch for coupling the output of the detecting means to the switching means so that all incoming signals other than stereo signals are effectively squelched.